(12) United States Patent
O'Keeffe

(10) Patent No.: US 10,603,988 B2
(45) Date of Patent: Mar. 31, 2020

(54) AUTONOMOUS VEHICLE THAT MINIMIZES HUMAN REACTIONS

(71) Applicant: Vlyte Innovations Limited, Shannon Airport (IE)

(72) Inventor: Donal O'Keeffe, Parteen (IE)

(73) Assignees: Vlyte Innovations Limited, Shannon (IE); Vlyte Limited, Shannon (IE)

(*) Notice: Subject to any disclaimer, the term of this patent is extended or adjusted under 35 U.S.C. 154(b) by 215 days.

(21) Appl. No.: 15/768,867

(22) PCT Filed: Oct. 4, 2016

(86) PCT No.: PCT/EP2016/073599
§ 371 (c)(1),
(2) Date: Apr. 17, 2018

(87) PCT Pub. No.: WO2017/071911
PCT Pub. Date: May 4, 2017

(65) Prior Publication Data
US 2019/0366811 A1  Dec. 5, 2019

(30) Foreign Application Priority Data
Oct. 28, 2015  (GB) .................................. 1519082.0

(51) Int. Cl.
*B60J 3/04* (2006.01)
*B32B 17/10* (2006.01)
(Continued)

(52) U.S. Cl.
CPC ............ *B60J 3/04* (2013.01); *B32B 17/1077* (2013.01); *B32B 17/10495* (2013.01);
(Continued)

(58) Field of Classification Search
CPC .................. B60J 3/04; B32B 17/10495; B32B 17/10678; B32B 17/10761;
(Continued)

(56) References Cited

U.S. PATENT DOCUMENTS 5,985,486 A  11/1999  Giron
6,900,923 B2  5/2005  Chakrapani et al.
(Continued)

FOREIGN PATENT DOCUMENTS

DE  102015103194 A1  9/2015
DE  102014226188 A1  6/2016
(Continued)

OTHER PUBLICATIONS

Anderson, James M., et al., "Autonomous Vehicle Technology—A Guide for Policymakers," RAND Corporation, Available online at: <<https://www.rand.org/content/dam/rand/pubs/research_reports/RR400/RR443-2/RAND_RR443-2.pdf>>, Copyright 2016, Santa Monica, California, USA, 214 pages.
(Continued)

*Primary Examiner* — Russell Frejd
(74) *Attorney, Agent, or Firm* — Withrow & Terranova, P.L.L.C.

(57) ABSTRACT

A road vehicle capable of autonomous driving has a windshield (10) and a control system (30) being configured to selectively control a regular visible light transmittance of the windshield (10) between two or more electrically switchable light states that provide respective levels of visual access through the windshield (10) from outside the vehicle according to a driving context for the vehicle.

16 Claims, 7 Drawing Sheets

(51) Int. Cl.
    *B60R 16/037*     (2006.01)
    *B60W 40/02*     (2006.01)
    *B60W 40/12*     (2012.01)
    *G06K 9/00*     (2006.01)

(52) U.S. Cl.
    CPC .. *B32B 17/10678* (2013.01); *B32B 17/10761* (2013.01); *B32B 17/10788* (2013.01); *B60R 16/037* (2013.01); *B60W 40/02* (2013.01); *B60W 40/12* (2013.01); *G06K 9/00845* (2013.01); *B60W 2550/20* (2013.01)

(58) Field of Classification Search
    CPC .......... B32B 17/1077; B32B 17/10788; B60R 16/037; B60W 40/02; B60W 40/12; B60W 2550/20; G06K 9/00845
    See application file for complete search history.

(56) References Cited

U.S. PATENT DOCUMENTS

| | | | |
|---|---|---|---|
| 6,934,067 B2 | 8/2005 | Ash et al. | |
| 7,957,054 B1 | 6/2011 | Yeo et al. | |
| 8,126,642 B2 | 2/2012 | Trepagnier et al. | |
| 8,837,032 B2 | 9/2014 | Lam et al. | |
| 8,854,714 B2 | 10/2014 | Clapp et al. | |

FOREIGN PATENT DOCUMENTS

| | | |
|---|---|---|
| EP | 2746833 A1 | 6/2014 |
| EP | 2998786 A1 | 3/2016 |
| EP | 3031654 A1 | 6/2016 |
| WO | 2012154208 A2 | 11/2012 |
| WO | 2014116898 A1 | 7/2014 |
| WO | 2014146937 A2 | 9/2014 |
| WO | 2014204387 A1 | 12/2014 |

OTHER PUBLICATIONS

International Search Report and Written Opinion for International Patent Application No. PCT/EP2016/073599, dated Jan. 24, 2017, 13 pages.

International Preliminary Report on Patentability for International Patent Application No. PCT/EP2016/073599, dated May 11, 2018, 8 pages.

AUTONOMOUS VEHICLE THAT MINIMIZES HUMAN REACTIONS

This application is a 35 USC 371 national phase filing of PCT/EP2016/073599, filed Oct. 4, 2016, which claims priority to GB application number 1519082.0, filed Oct. 28, 2015, the disclosures of which are incorporated herein by reference in their entireties.

FIELD

The present invention relates to vehicles operated autonomously, and vehicles capable of being operated either autonomously or with a human driver.

BACKGROUND TO THE INVENTION

Wikipedia defines an autonomous vehicle as an uncrewed vehicle, a driverless vehicle, a self-driving vehicle, or a robotic vehicle. Other terms include cyber vehicle or pod. These terms can be used interchangeably and generally mean that the autonomous vehicle is capable of fulfilling the main capabilities of a driver operated vehicle, at least for the task(s) that autonomous operation covers. For example, it can be allowable for a car to be driven autonomously on a motorway but not in certain other roads such as local roads or town streets. An autonomous vehicle is capable of sensing its environment and navigating without human input using techniques such as radar, lidar, ultrasonic, sonar, GPS, and computer vision. Advanced vehicle control systems interpret sensory information to identify appropriate navigation paths, as well as obstacles and relevant signage. Information on the background and use of autonomous vehicles can be found in 'Autonomous Vehicle Technology—A Guide for Policymakers' available from www.rand.org.

An area of autonomous vehicle use that is of concern in this document is the reactions of human beings to autonomous vehicles. In a first category the reactions can involve extreme emotions. Other road users can feel fear or alarm when being approached by a driverless vehicle, or, occupants of an autonomously driven vehicle can feel fear or alarm in a perceived near-collision event. Both situations can invoke undesired and possibly dangerous reactions such as mistaken collision avoidance actions.

For example, a driver may alter his/her driving line around a corner taking dangerous evasive action when suddenly confronted with a vehicle that has no driver or where the driving seat is occupied by a person who is obviously not looking at the road ahead. In another example, the occupant of an autonomous vehicle may be sitting in the driving seat but not operating the vehicle when confronted with a perceived imminent collision. Human reaction in this latter case is to take control from the autonomous system even though the likely consequence is overall loss of vehicle control and a collision where continued autonomous operation would have avoided the collision.

The preceding were examples of extreme human reactions in the context of autonomous driving, but, there are other situations where human reactions to autonomous vehicles can have undesirable changes in behaviour. For example, drivers of other vehicles may alter their driving about autonomous vehicles such as by leaving more or less space on the road for an autonomous vehicle, or being afraid to make legal road manoeuvres until an autonomous vehicle has passed. The latter can cause unnecessary traffic congestion at road junctions. Furthermore, it is reasonable to assume that drivers will show less road courtesy to autonomously driven vehicles and this can have consequences that lower overall road safety.

In an example of undesirable behavioural change about autonomously driven vehicles other drivers may anticipate the response of an autonomous vehicle and drive aggressively to exploit this knowledge. For example, a driver from a side road may aggressively push into traffic secure in the knowledge that an approaching autonomous vehicle will stop to avoid a collision. In another example, a driver may enter a roundabout to cut-off an autonomous vehicle with right-of-way knowing that the autonomous vehicle will sense its presence, compute that a collision is imminent, and take evasive action. Pedestrians may intentionally cross in front of oncoming autonomous vehicles knowing that they will stop, or at traffic lights continue crossing when the lights have gone red. These reactions to autonomous driving will be disruptive to traffic flow, to other road users, and overall road safety.

A third category of possible human reaction to autonomously driven vehicles is anti-social driving behaviour or driving with near criminal intent. In an example of anti-social driving behaviour drivers may increase their driving speed about autonomous vehicles based on the anticipated (or imagined) safety response of autonomous vehicles. A driver may make an unsafe overtaking manoeuvre against an approaching autonomous vehicle knowing that the vehicle will automatically pull into the road side to avoid a collision if necessary. In an example of criminal intent, a driver may intentionally drive at an autonomous vehicle knowing that the vehicle must respond in a predictable way to avoid the collision.

An autonomous capable vehicle can also be the source of anti-social driver behaviour if it is equipped to take control from a driver in a dangerous situation. The driver may speed or make dangerous road manoeuvres secure in the knowledge that the vehicle's autonomous control system will take over to avoid a collision if necessary.

It is known that some road users alter their behaviour consciously or unconsciously depending on the size of their vehicle and their perceived vulnerability to other road users. Cyclists are among the most vulnerable road users and some drivers exploit this, especially in urban driving conditions. It would be surprising if some drivers didn't alter their behaviour about autonomously driven vehicles and this invention seeks to minimize undesirable reactions and behavioural changes.

The present invention minimizes the reaction some people can have to vehicles being driven autonomously. It provides a solution that minimizes peoples' reaction outside an autonomously driven vehicle and/or inside.

SUMMARY OF THE INVENTION

A road vehicle capable of autonomous driving, the vehicle being configured to selectively control a regular visible light transmittance (transmission) of its windshield choosing from two or more electrically switchable light states that provide two or more levels of visual access through the windshield from outside the vehicle according to a driving context for the vehicle.

In embodiments the windshield has a first light state that provides visual access from the outside environment to inside the vehicle (i.e. for other road users) through the windshield simultaneously with providing visual access from inside to the outside (i.e. for a vehicle's occupants) and a second light state that obstructs visual access from outside to inside simultaneously with providing (unobstructed) visual access from inside to the outside.

In embodiments the vehicle's windshield incorporates one or more switchable light modulators that implement the light states and the vehicle's control system controls autonomous driving and is functionally coupled to the windshield's light modulator to selectively operate the light states.

In embodiments the windshield is a human-machine-interface selectively operable by the road vehicle's control system to optimize human behaviour and ergonomics by providing two or more levels of visual access responsive to a driving context.

In embodiments in the second light state the windshield both attenuates the illuminance inside (i.e. daylight that it transmits attenuated) and the luminance therefrom transmitted to the outside (i.e. regular light that it transmits attenuated) and obstructs visual access from outside, but, the illuminance outside is not attenuated and the windshield attenuates only the luminance therefrom transmitted to the inside and provides visual access from inside to the outside.

In embodiments in use the eye adaptation of occupants to the attenuated illuminance inside the vehicle provided by the second light state results in the perceived brightness of objects viewed through the windshield remaining near contrast between the first and second light states (after occupants' eyes have completed adaptation to each light state) and visual access is maintained for occupants to the outside.

In some embodiments the vehicle control system dynamically selects the windshield's light states responsive to the driving context including: autonomous or human driving, vehicle occupancy status, the driving environment's light level (i.e. day or night, bright or dark), weather conditions, proximity of other road users, type of road user detected (pedestrian, conventional vehicle or autonomous vehicle), type of occupant (adult, child, or disability), surrounding traffic level and flow, driving speed, urban or rural location, road type (motorway, regional, or city street), detection of a situation likely to alarm occupants, mandatory requirement to provide or deny visual access in certain areas/situations, law enforcement override, proximity of certain infrastructure, privacy or security requirement, operator/occupant override of programmed settings, transitioning on engaging autonomous driving, or transitioning between autonomous driving and coming to a stop at a destination.

In embodiments the switchable windshield attenuates the incident visible light spectrum by absorbing, reflecting, or scattering light, and preferably light absorption accounts for the greatest loss of regular visible light transmission in the second light state.

In embodiments the windshield's first light state has a visible light transmittance (or transmission level) of 45% or more and provides visual access from the outside and its second light state has 35% or less visible light transmittance and obstructs visual access from the outside (at least for some road users in some driving contexts).

In some embodiments the first light state is selected by the vehicle control system while human driving and the second light state is selectable only while autonomously driving.

In embodiments the switchable light modulator includes one of the following electro-optical types, or hybrid versions thereof: an electrophoretic device, a liquid crystal device, a guest-host liquid crystal device, a dye-doped liquid crystal device, an electrochromic device, an electrochromic device incorporating an electrolytic fluid gel, an electrokinetic device, a suspended particle device, or an electro-wetting device.

In some embodiments while autonomously driving in a dark environment (e.g., night or dark tunnel) the vehicle control system selects the first light state and in a bright environment (e.g., in daylight or well-lit streets) it selects the second light state.

In embodiments that provide driver-mode the vehicle control system monitors the functioning of the switchable light modulator in the windshield ensuring that a required minimum visible light transmittance is provided.

In some embodiments the vehicle independently operates the visual access of its other windows and/or openings by incorporating one or more switchable light modulators therein.

In embodiments the windshield and optionally other vehicle windows are an autonomous driving subsystem that is selectively operated by the vehicle control system.

In some embodiments the windshield in the second light state appears strongly tinted or reflective (i.e. mirror-like) and impairs transparency denying visual access from outside in daylight.

In some embodiments the windshield has a third light state, and it is selectable in autonomous-driving-mode and its regular visible light transmittance is significantly lower than the second light state and it denies visual access from the outside and reduces visual access from inside to the outside.

In use in some embodiments the vehicle control system selects the third light state to obstruct visual access to the outside in emergency situations or situations likely to alarm a vehicle's occupants.

In some embodiments the windshield has a fourth light state, and it is selectable in autonomous-driving-mode and its regular light transmittance is near negligible and the windshield is quasi-opaque when viewed from either side providing privacy and security.

In some embodiments intermediate light states between the first and one or more of the second, third or fourth light states are selectable and provide a windshield with variable visible light transmittance between these extreme light states. Some embodiments use an intermediate light state in place of the first, second, third or fourth light states in response to a vehicle's driving context.

In some embodiments the vehicle control system operates in-cabin lighting or increases the visible light transmittance of a roof opening to avoid a loss of illumination inside the cabin on selecting the third or fourth light states for the vehicle's windshield and/or other windows and consequently prevents (or minimizes) eye adaptation in occupants.

In some embodiments while the vehicle is in autonomous-driving-mode, or parked, the windshield's light states and those of other windows and openings can be remotely selected including over the internet.

In some embodiments the vehicle control system uses its intermediate light states to provide progressive change in the windshield's visible light transmittance over a time period (e.g., five minutes) that allows at least partial adaptation of occupants' eyes to the changing illuminance in the cabin. In some embodiments the vehicle control system in autonomous-driving-mode transitions using its intermediate light states from the second light state (or another reduced light transmittance state) to the first light state over a short time period (e.g., 1-5 minutes) preceding stopping the vehicle at a destination.

In embodiments the vehicle control system is functionally coupled by wiring or wirelessly to an embedded system that powers and provides driving signals to the one or more switchable light modulators.

In some embodiments in use the vehicle control system momentarily selects (or flashes) the first light state (in response to a V2X communication) so that a remote camera (e.g., a speed camera) can capture an image through the windshield.

In some embodiments the status of visual access from outside the vehicle is displayed as information (i.e. text or icon) within the cabin.

In autonomous-driving-mode the vehicle control system can change the eye adaptation of occupants over time by using the electrically selectable light states of its one or more switchable windows to significantly change the illuminance inside a vehicle when compared to outside.

In some embodiments the vehicle control system uses an eye tracking system to monitor the eye adaptation of one or more occupants and uses this data as input to an algorithm that selects a light state.

In some embodiments when transitioning over a time period between a current light state and a final state an eye tracking system provides feedback (or be a feedback loop) to the vehicle control system on the progress of eye adaptation with occupants.

In some embodiments where most or all of an autonomous vehicle's windows are switchable light modulators the contrast ratio defined as the ratio of illuminance outside to inside the vehicle (i.e. the cabin) is controlled in autonomous-driving-mode during daylight (and optionally in brightly lit areas at night time). In embodiments the vehicle operates with a ratio of 2.0 or more.

In some embodiments having multiple light modulator windows the vehicle control system can operate each window independently such that visual access can be denied at one side of the vehicle but not the other.

In embodiments the switchable windshield has one or more transparent light states and includes the following: a smart window, a switchable window, an electronic dimming window, a light shutter, a light attenuator, a variable light transmittance device, a variable light absorptance device, a variable light reflectance device, a variable light scattering device, a light control device, an electronic skin, a monochrome display, a colour display, or a see-through display.

In embodiments the windshield's switchable light modulator can vary its transparency, and concomitantly its visual access, by acting on part (i.e. one or more bands) or the entire visible light spectrum (i.e. 380 nm to 780 nm) and in some embodiments different light states have different spectrums.

In some embodiments the switchable windshield's transparency and visual access is changed by selecting light states that change the specular reflection as well as the regular (specular) transmittance.

In some embodiments the switchable windshield comprises a switchable light modulator film laminated between glass panes in a sandwich structure with optical adhesive known as interlayers, and the resulting monolithic laminate is bonded or fixed to the vehicle bodywork. In some embodiments one or both glass panes are clear glass (i.e. untinted) and maximize the visible light transmittance of the windshield in the first light state. In other embodiments the windshield's outer pane is a laminate of two panes and the switchable light modulator is laminated between it and an inner pane.

In some embodiments a prior-assembled windshield has a switchable light modulator bonded to its inside face (i.e. facing the cabin).

In embodiments the switchable light modulator comprises two parallel spaced apart transparent film substrates that are coated with transparent electrodes, and in the space between an electro-optical cell, and the cell is responsive to electrical signals applied to the electrodes to select light states.

In some embodiments the electro-optical cell is an electrophoretic cell and contains an electrophoretic ink and polymer structures, and the electrophoretic cell is bonded to the substrates, and the electrophoretic ink has charged particles suspended in a suspending fluid and responsive to an electric field applied to the electrodes to select light states; and in the first light state charged particles are maximally concentrated within the electrophoretic cell to remove them from the path of visible light through the windshield and maximize visible light transmittance and provide visual access and in the second light state charged particles are spread within the cell to lie in the path of visible light through the windshield and reduce light transmittance and obstruct visual access.

In embodiments the switchable windshield is functionally coupled to the vehicle control system through its switchable light modulator driver and controller system using a wireless link, a wired link, a vehicle bus, or any combination of these.

BRIEF DESCRIPTION OF THE DRAWINGS

Embodiments of the invention are now described, by way of example, with reference to the accompanying drawings, in which.

DETAILED DESCRIPTION

Figure 1A:
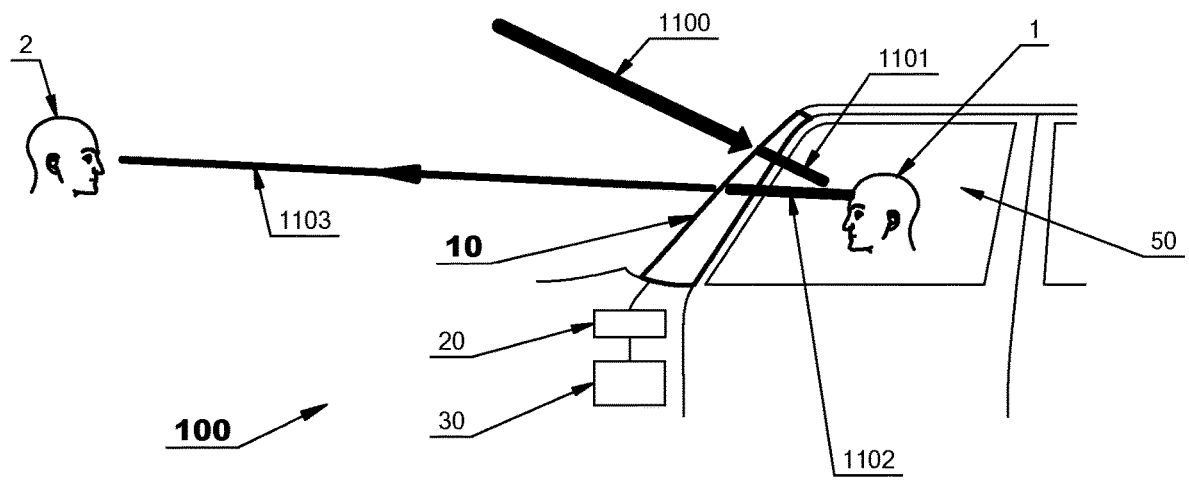
FIG. 1a shows an embodiment 100 of an autonomous vehicle system with its windshield in a first light state and from the perspective of someone outside the vehicle.

In embodiments human reaction to an autonomously driven road vehicle is minimized by the vehicle control system using a functionally coupled switchable light modulator embedded in the vehicle's windshield (or windscreen). The vehicle control system electronically selects the transparency of the vehicle's windshield, or a portion of it, and optionally the other windows and/or openings as well, using the switchable light modulator(s). Concomitantly with selecting the windshield's transparency, the vehicle control system controls visual access through the windshield and optionally the other windows. For road users outside of the vehicle the visible light transmittance of the embodiment's windshield incorporating a light modulator is reduced sufficiently in autonomous-driving-mode (i.e. when being driven autonomously) to obstruct visual access to the vehicle's interior. The vehicle's control system operates the windshield to appear strongly tinted or reflective (i.e. mirror-like) and to impair transparency sufficiently to preferably deny visual access. Those outside of the vehicle do not have a satisfactory visual cue as to whether the vehicle is being operated autonomously or by a driver, or if the driver's seat is vacant. Consequently, adverse reactions to an autonomously driven vehicle equipped with an embodiment are minimized, in particular, the bad behaviour of other road users that seek to exploit the predictable collision-avoidance of autonomous vehicles (examples of bad behaviour are described in the section 'Background to the Invention').

In embodiments autonomous-driving-mode (or autonomous driving) is interchangeable with self-driving-mode and refers to a vehicle driving without the assistance of human operation and in some embodiments, without human occupancy. In some embodiments the autonomous vehicle has the option of human driving and provides a driver-mode. In other embodiments the vehicle does not provide conventional human driving aids such as a steering wheel and/or pedals. In embodiments having driver-mode the vehicle's control system selects a light state for its windshield that provides maximal visible light transmittance and transparency, and so visual access, at a level comparable to conventional vehicles. Autonomous vehicle embodiments are vehicles that are driven on public roads including passenger vehicles, commercial vehicles, cars, vans, buses, trucks, and robotic vehicles.

At a minimum embodiments provide windshields (or a portion there of) with two extreme visible light transmittances or light states that are electronically selectable corresponding to different levels of transparency. A first light state provides 45% or more visible light transmittance (and preferably 57.5% or more, and more preferably 62.5% or more, and most preferably 65% or more) and a second light state provides 35% or less (and preferably 28% or less, and more preferably 25% or less, and most preferably 20% or less). In some embodiments in driver-mode the vehicle control system limits selection to the first light state (or light states for the windshield that exceed a minimum level of visible light transmittance) and in autonomous-driving-mode all light states can be selected. In vehicle embodiments that do not provide the option of human driving a first light state provides the autonomous vehicle with maximum transparency. Examples of autonomous driving situations that require the vehicle control system to select maximum windshield transparency include providing an unobstructed view into the vehicle when requested by law enforcement, or, when a passenger is about to enter a vehicle. In another example, the autonomous vehicle's control system can select its maximum windshield transparency (i.e. a first light state) at night-time on unlit roads to maximize occupants' view through the windshield.

In embodiments the vehicle control system selects the light state of the vehicle's windshield in response to the driving context. Examples of the driving context include: autonomous driving or human driving, vehicle occupancy status, the driving environment's light level (i.e. day or night, bright or dark), weather conditions, proximity of other road users, type of road user (pedestrian, conventional vehicle or autonomous vehicle), type of occupant (adult, child, or disability), surrounding traffic level and flow, driving speed, urban or rural location, road type (e.g. motorway, regional, or city street), detection of a situation likely to alarm occupants, mandatory requirement to provide or deny visual access in certain areas/situations, proximity of specified infrastructure, privacy or security requirement, operator/occupant override of default or programmed settings, transitioning on engaging autonomous driving, or transitioning between autonomous driving and coming to a stop at a destination. In embodiments the windshield is a human-machine-environment interface selectively operable by the road vehicle's control system in a driving context to optimize human behaviour, well-being or ergonomics through selection of visual access as well as environment control through selection of solar (from uv to infra-red) transmission.

Figure 1B:
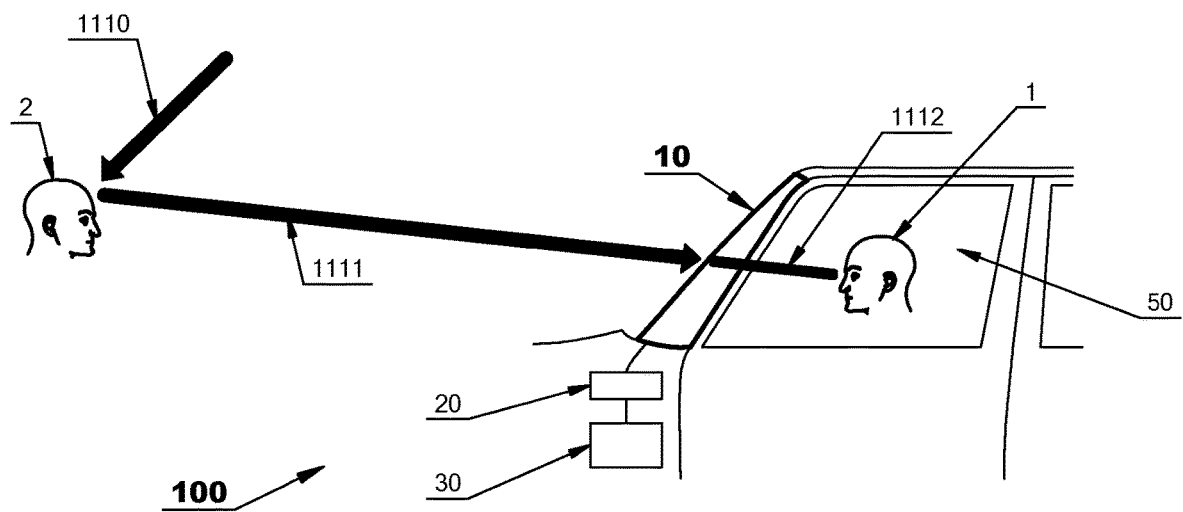
FIG. 1b also shows embodiment 100 in the first light state but from the perspective of a vehicle's occupant.
Figure 2A:
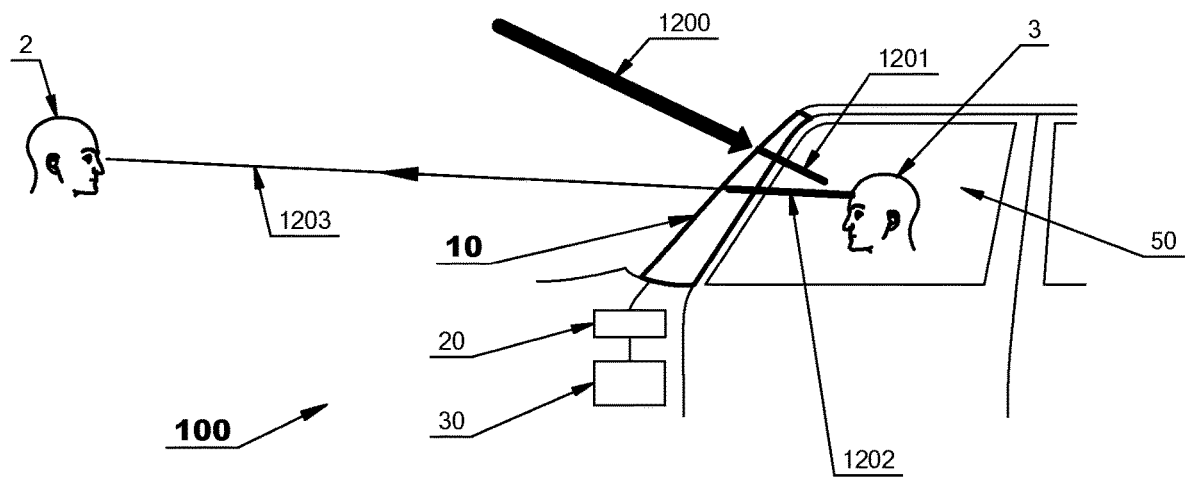
FIG. 2a shows embodiment 100 in a second light state and from the perspective of someone outside the vehicle.
Figure 2B:
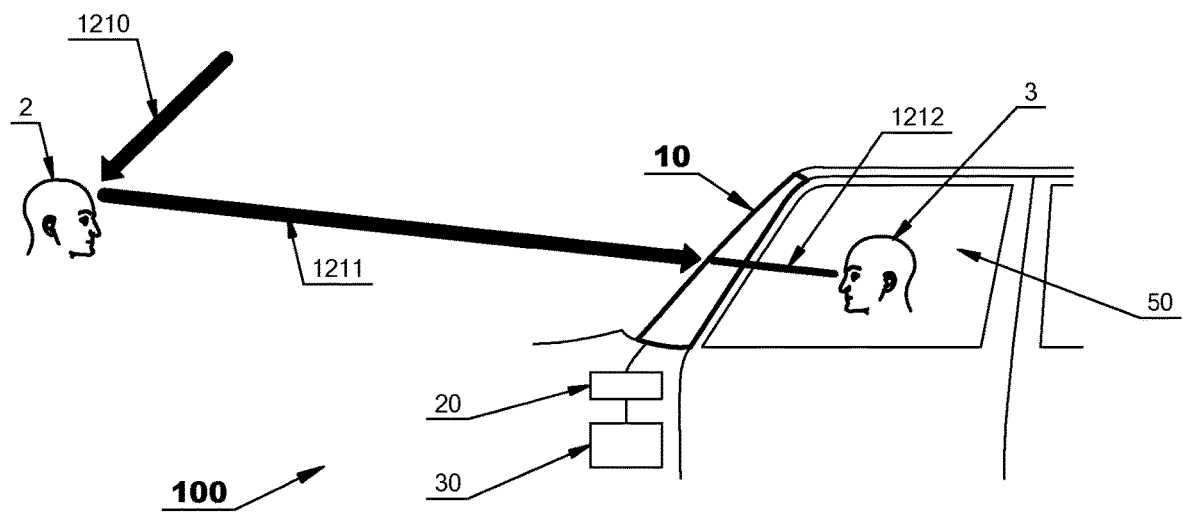
FIG. 2b also shows embodiment 100 in the second light state but from the perspective of a vehicle's occupant.

In embodiment 100 shown in FIGS. 1a and 1b the windshield's first light state provides visual access from the outside environment to inside the vehicle for other road users simultaneously with providing visual access from inside to the outside for a vehicle's occupants similar to a conventional windshield. FIGS. 2a and 2b show the same embodiment 100 in the second light state obstructing visual access from outside to inside for other road users simultaneously with providing visual access from inside to the outside for a vehicle's occupants analogous to a one-way mirror (and described later).

FIGS. 1a and 1b show autonomous vehicle embodiment 100. The vehicle control system 30 has engaged driver-mode. The windshield embodiment 10 incorporates a switchable light modulator 115 (as described later and shown in FIG. 6) and it is in the first light state. FIG. 1a is from the perspective of a viewer 2 outside of the autonomous vehicle embodiment 100, and FIG. 1b is from the perspective of a driver 1 in the vehicle's cabin 50. The vehicle control system 30 is connected to an embedded system 20 that powers and provides driving signals to the switchable light modulators in the vehicle 100.

In FIG. 1a daylight 1100 is representative of the significant illuminance on the outer surface of the windshield 10 (e.g., 1,000 lux on an overcast day). In the first light state windshield 10 transmits its maximum level of visible light (e.g., 70% normal to its surface) as indicated by the slightly reduced width of transmitted light 1101. In the figures the light rays are shown with different widths, this is to indicate different light intensities either side of an embodiment's windshield 10 depending on the light transmittance of the light state shown. The cabin 50 is illuminated by daylight 1101 transmitted by its windshield and windows (and/or openings) and its illuminance is about 700 lux (using the example of an overcast day). This light in the cabin is incident on surfaces such as the face of driver 1 and produces luminance visible from outside the vehicle. Light ray 1102 is in the direction of viewer 2. The windshield 10 transmits this ray with minimum attenuation in the first light state as indicated by the slightly reduced width of ray 1103. Driver 1 is visible to viewer 2 and the surfaces within the cabin 50 have a similar brightness level (i.e. luminance) to conventional vehicles.

FIG. 1b shows the first light state of embodiment 100 from the perspective of driver 1. Daylight 1110 provides illuminance on the face of viewer 2. Luminance is visible in the direction of driver 1 as indicated by light ray 1111. Windshield 10 transmits this as ray 1112 and viewer 2 is highly visible to driver 1. The luminance of surfaces outside the vehicle and viewed through windshield 10 in daylight have a similar brightness level to conventional vehicles.

FIGS. 2a and 2b show the autonomous vehicle 100 with its windshield 10 in the second light state. The vehicle control system 30 has engaged autonomous-driving-mode. The second light state can be selected by the vehicle control system 30 when autonomous-driving-mode is engaged or when not in driver-mode. In FIG. 2a daylight 1200 provides significant illuminance on the outer surface of windshield 10. In the second light state windshield 10 transmits about 35% of visible light or less (normal to its surface) as indicated by the reduced width of transmitted light 1201. The cabin 50 is illuminated by daylight 1201 transmitted by its windshield 10 and windows (and/or openings) and its illuminance can be half or less that of the first light state. This light in the cabin is incident on surfaces such as the face of occupant 3 and produces luminance. Occupant 3 can be the same person as driver 1 shown in FIGS. 1a and 1b, however, to avoid confusion the person occupying the driver's seat is referred to as an occupant as he/she does not provide driving assistance to the vehicle when autonomous-driving-mode is engaged by the vehicle control system. Light ray 1202 is in the direction of viewer 2. The windshield 10 transmits this ray with 35% transmittance of visible light or less in the second light state as indicated by the reduced width of ray 1203. Occupant 3 and the surfaces of cabin 50 are obscured by windshield 10 in the second light state. Depending on the transmittance of windshield 10, and the eye adaptation level of viewer 2 (adapted to the outside environment), occupant 3, or the absence of an occupant in the driver's seat, can be hidden from viewer 2.

Advantageously in the second light state windshield 10 both reduces the illuminance of cabin 50 (as daylight is transmitted to cabin 50) and reduces the luminance of occupant 3 as perceived by viewer 2 as light (from occupant 3) must travel a second time through windshield 10. In an example the windshield's second light state transmittance is 25% and this reduces the daylight illuminance in the cabin to 25% of that outside. As a consequence the luminance of surfaces in the cabin 50 are then 25% of what they would be if outside the vehicle. As the light from surfaces must pass through windshield 10 to reach viewer 2 the perceived luminance is further reduced and approximates 6.25% (i.e. 0.25×0.25) of what the luminance would be if occupant 3 were outside the cabin (and otherwise in viewer 2's line of sight and at a similar distance).

FIG. 2b shows the second light state of embodiment 100 from the perspective of occupant 3. Daylight 1210 provides illuminance on the face of viewer 2. Luminance is visible in the direction of occupant 3 as indicated by light ray 1211. Windshield 10 transmits this as ray 1212 with the transmittance provided by the second light state. Viewer 2 is highly visible because occupant 3's eyes are adapted to the lower illumination inside the cabin (as described in relation to FIG. 2a). Advantageously, occupant 3 perceives viewer 2 to be just as visible as in the first light state (to driver 1) shown in FIG. 1b assuming daylight conditions because the occupants' eyes are adapted to the lower cabin illuminance provided by the second light state. Furthermore, in addition to the occupants' eyes having adapted to the lower cabin illuminance (provided by the second light state of embodiments) the luminance of outside objects viewed through the windshield 10 by an occupant 3 are a multiple of the corresponding luminance of inside objects viewed by viewer 2. This is shown in FIGS. 2b and 2a by the difference in light ray widths between rays 1212 (luminance reaching occupant 3) and ray 1203 (luminance reaching viewer 2).

In the example given for FIG. 2a of a windshield having 25% transmittance, the luminance reaching occupant 3 (ray 1212 in FIG. 2b) is 25% of what it would be if outside the cabin (and represented by ray 1211), or four times greater than provided to viewer 2 (ray 1203) in FIG. 2a (i.e. 25%/6.25%=4). Significantly, the reduction in luminance reaching occupant 3 through windshield 10 in the second light state is matched by a corresponding eye adaptation (over time) in occupant 3 to a similar reduction in illuminance inside the cabin also provided by windshield 10. In an embodiment example where the windshield 10 and other windows have 25% transmittance in the second light state the luminance of outside objects is reduced to 25% concomitantly with the illumination in the cabin being reduced to 25%, and over time the occupants' eyes adapt to the lower illuminance inside the vehicle with the result that objects outside the vehicle are just as visible to occupants in the second light state as in the first (i.e. no perceived loss of transparency in windshield 10 for occupants). This demonstrates the surprising dual functionality and principle of embodiments selectable in autonomous-driving-mode: windshield 10 obstructs visual access there through from outside the vehicle to inside while providing visual access from inside to the outside environment in the second light state.

In this regard operation of the embodiment is analogous to the principle of a one-way mirror (also known as a two-way mirror) where observers in the dark side (corresponding to the vehicle's cabin) see a transparent opening that provides visual access but observers on the bright side (corresponding to the outside environment) see their reflection in a mirror and have no visual access through the opening to the dark side. In some embodiments the switchable light modulator is reflective (i.e. provides selectable light states with different levels of specular light reflection as well as regular light transmission) and the windshield is a switchable one-way mirror.

In embodiments the visible light transmittance of either the first or second light states (or both) can be fixed levels such as mandated by law, predetermined levels as selected by the vehicle's manufacturer or the vehicle user, or dynamic levels calculated using algorithms that use as input data from sensors monitoring the driving environment such as the illuminance outside the vehicle. It is sufficient in the second light state to provide reduced or diminished visibility from outside to inside when compared to the first light state as shown by the difference in line width (representing light intensity) between FIG. 1a's light ray 1103 and FIG. 2a's ray 1203. The reduced visibility operated in autonomous-driving-mode can be effective in denying visual access from outside for some or all road users and in some or all driving contexts. For example, some road users' perception of reduced visibility can be momentary as a moving autonomous vehicle passes quickly in flowing traffic whereas pedestrians at a junction have more time to concentrate on seeing through the windshield of a stopped autonomous vehicle.

Notwithstanding that embodiments in autonomous-driving-mode can maintain visual access for a vehicle's occupants to the outside environment, there are embodiments where it can be desirable to reduce or deny this visual access also. In some embodiments the vehicle control system operates the windshield in a third light state that selectively reduces transparency sufficiently to reduce visual access to the outside for a vehicle's occupants. In yet other embodiments the vehicle control system operates the windshield in a fourth light state that is quasi-opaque and denies visual access. In some embodiments intermediate light states between the first and one or more of the second, third or fourth light states are selectable to provide a windshield with variable, regular visible-light-transmittance (or transmission) between these extreme light states.

Figure 3A:
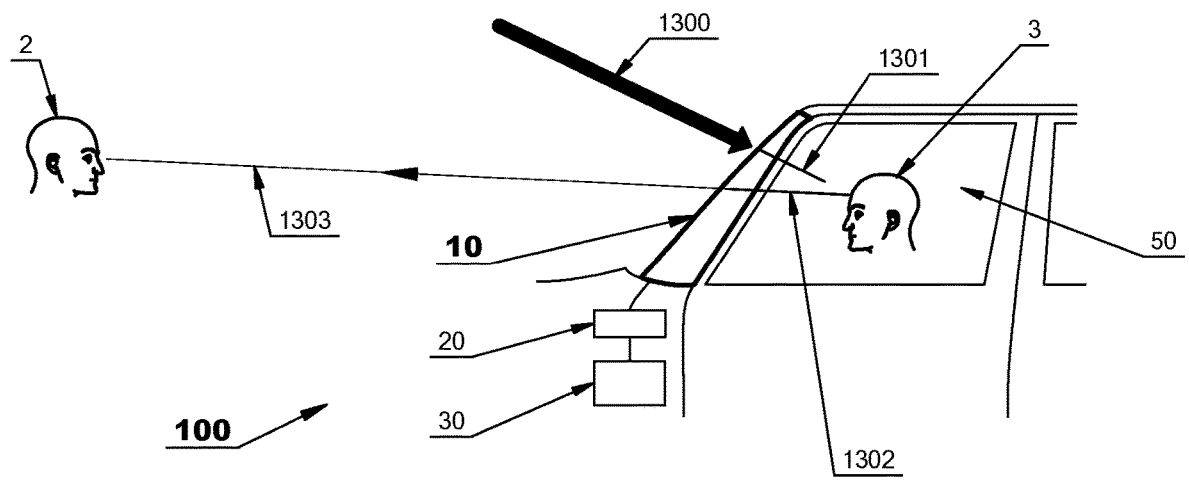
FIG. 3a shows embodiment 100 in a third light state and from the perspective of someone outside the vehicle.
Figure 3B:
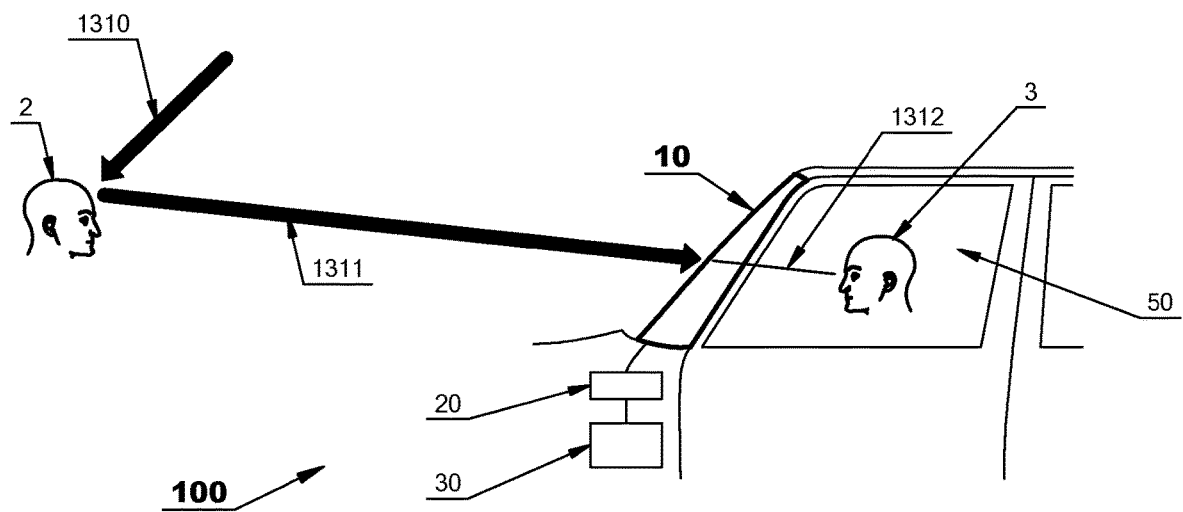
FIG. 3b also shows embodiment 100 in the third light state but from the perspective of a vehicle's occupant.

FIGS. 3a and 3b show the third light state of a windshield embodiment 10 from the perspective of someone outside a vehicle and a vehicle's occupant respectively. The vehicle control system 30 of autonomous vehicle 100 has engaged autonomous-driving-mode. The third light state can be selected by the vehicle control system 30 when autonomous-driving-mode is engaged, and its regular visible light transmittance is lower than in the second state and in some embodiments has a visible light transmittance of 10% or less.

Situations in which the third light state is desirable include emergency situations or situations likely to alarm a vehicle's occupants. When an emergency situation is detected by the vehicle (or remotely detected and communicated to the vehicle) visual access to the outside environment is momentarily reduced by the vehicle's control system to minimize fear or alarm felt by occupants as a collision is avoided. Similarly, in an otherwise safe manoeuvre that might be perceived by the vehicle's occupants as dangerous or cause alarm, visual access to the outside environment can be momentarily denied in some embodiments. An example of the latter is when two autonomously driven vehicles synchronize or coordinate in time and movement their driving such as when moving in convey, overtaking, or approaching each other from opposite directions and as a consequence of synchronizing their driving they come closer to each other than would be considered safe if both were driven by human drivers. Visual access for an embodiment's occupants can also be temporarily reduced in situations where for safety reasons the vehicle control system has temporarily overridden driver-mode (i.e. taken control from the driver) and engaged autonomous-driving-mode.

In some embodiments the vehicle control system operates the windshield's light states according to the type of occupant, in particular, if the occupants are only of one type. For example, if the occupants are children (i.e. no adult present) then the vehicle control system operates the windshield to provide privacy in autonomous-driving-mode using the third or fourth light states. In another example, if the occupant of the driver's seat (or the seat in conventional cars corresponding to the driver's seat) is blind he/she can select to operate the windshield to provide privacy analogous to choosing to wear dark glasses. In yet another example the vehicle control system monitors the occupant in the driver's seat (or any other seat) using eye tracking sensors to determine the alertness of the occupant and operates the windshield to provide privacy (or reduced cabin illuminance) if a sleeping occupant is detected.

In FIG. 3a daylight 1300 provides significant illuminance on the outer surface of windshield 10. In the third light state windshield 10 transmits about 10% of visible light or less (normal to its surface) as indicated by the reduced width of transmitted light 1301. The cabin 50 is illuminated by daylight 1301 transmitted by its windshield and windows (and/or openings) and its illuminance is a fraction (e.g., ≤1/7) of the first light state. This light in the cabin is incident on surfaces such as the face of occupant 3 and produces luminance. Light ray 1302 is in the direction of viewer 2. The windshield 10 transmits this ray with 10% transmittance of regular visible light or less in the third light state as indicated by the reduced width of ray 1303. Occupant 3 and the surfaces of cabin 50 are obscured by windshield 10 in the third light state. Depending on the transmittance of windshield 10, and the eye adaptation level of viewer 2 (adapted to the outside environment), occupant 3, or the absence of an occupant in the driver's seat, can be hidden from viewer 2.

In an embodiment example the third light state's transmittance is 5% and this reduces the daylight illuminance in the cabin to 5% of that outside. As a consequence the luminance of surfaces in the cabin 50 are then 5% of what they would be if outside the vehicle. As the light from surfaces must pass through windshield 10 to reach viewer 2 the perceived luminance is further reduced and approximates just 1/400 (i.e. 0.05×0.05) of what the luminance would be if occupant 3 were outside the cabin.

FIG. 3b shows the third light state of embodiment 100 from the perspective of occupant 3. Daylight 1310 provides illuminance on the face of viewer 2. Luminance is directed in the direction of occupant 3 as indicated by light ray 1311. Windshield 10 transmits this as ray 1312 with the transmittance (10% or less) provided by the third light state. Immediately on switching to the third light state the view through the windshield is reduced because occupant 3's eyes don't have time to adapt to the lower illumination inside the cabin (as described in relation to FIG. 3a). In the example given for FIG. 3a of a windshield having 5% transmittance, the luminance reaching occupant 3 (ray 1312 in FIG. 3b) is 5% of what it would be if outside the cabin (i.e. ray 1311), or about one fifth of the luminance given in the example accompanying FIGS. 2b (i.e. 25% transmittance for windshield 10 in the second light state).

In some embodiments in-cabin lighting is used to maintain the illumination inside the cabin on switching to the third light state to compensate for the loss of daylight when switching between the second and third light states and prevent (or minimize) eye adaptation in occupants. In alternative embodiments a roof opening is used to maintain illumination inside the cabin and the vehicle control system operates a light modulator in the vehicle's opening with a higher light transmittance than used for the windshield (e.g., the roof is selected to be in the second light state when the windshield is in the third light state).

Figure 4A:
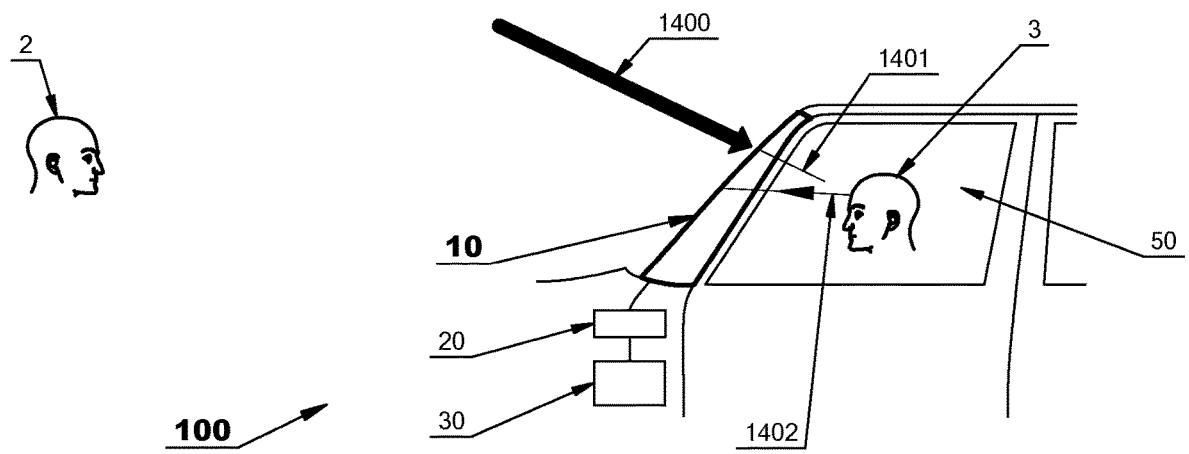
FIG. 4a shows embodiment 100 in a fourth light state and from the perspective of someone outside the vehicle.
Figure 4B:
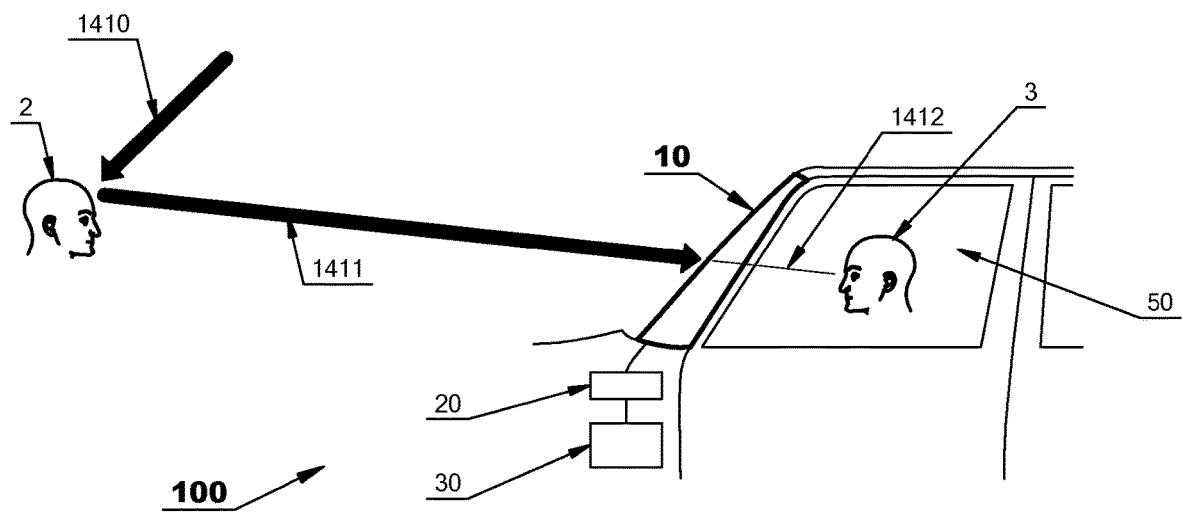
FIG. 4b also shows embodiment 100 in the fourth light state but from the perspective of a vehicle's occupant.

In some embodiments the vehicle control system operates the windshield to selectively deny visual access for a vehicle's occupants to provide privacy from other road users, and this can make use of a fourth light state or use the previously described third light state. The fourth light state of embodiments is shown in FIGS. 4a and 4b. The vehicle control system 30 of autonomous vehicle 100 has engaged autonomous-driving-mode. The fourth light state can be selected by the vehicle control system 30 when autonomous-driving-mode is engaged. To provide an effective privacy function in daytime or night-time autonomous driving conditions the visible light transmittance of a vehicle's windows, and optionally roof panes (i.e. transparent panels or openings), are selectively operated by the vehicle control system to be in a fourth light state that provides minimal transparency or regular light transmittance. Preferably, the fourth light state in embodiments is opaque. In some embodiments the vehicle control system operates the in-cabin lighting and/or the brightness of a vehicle's displays synchronized with the switchable light modulators. This is advantageous for example when providing privacy for occupants at night time in autonomous-driving-mode. It is also advantageous when denying visual access from outside the vehicle at night time, particularly if the vehicle is unoccupied. In the latter case the in-cabin lighting and display screens are turned off or dimmed to a minimum level in the autonomous-driving-mode of some embodiments.

In FIG. 4a daylight 1400 provides significant illuminance on the outer surface of windshield 10. In the fourth light state windshield 10 transmits about 3% of visible light or less (normal to its surface) as indicated by the reduced width of transmitted light 1401. The cabin 50 is illuminated by daylight 1401 transmitted by its windshield and windows (and/or openings) and its illuminance is a fraction (e.g., ≤⅟₂₃) that of the first light state. This light in the cabin is incident on surfaces such as the face of occupant 3 and produces a low level of luminance. Light ray 1402 is in the direction of viewer 2.

The windshield 10 transmits this ray with 3% transmittance of regular visible light or less in the fourth light state effectively reducing its light intensity to the point where the windshield can be considered quasi-opaque for viewer 2 and the vehicle's cabin is hidden.

In an embodiment example the fourth light state transmittance is 1% and this reduces the daylight illuminance in the cabin to 1% of that outside. As a consequence the luminance of surfaces (including occupant 3) in the cabin 50 are then 1% of what they would be if outside the vehicle. As the light from surfaces must pass through windshield 10 to reach viewer 2 the perceived luminance is further reduced and approximates just ⅟₁₀,₀₀₀ (i.e. 0.01×0.01) of what the luminance would be if occupant 3 were outside the cabin. Even when cabin lighting is used to provide illumination inside the cabin in the fourth light state the very low transmittance of windshield 10 can be sufficient to provide privacy.

FIG. 4b shows the fourth light state of embodiment 100 from the perspective of occupant 3. Daylight 1410 provides illuminance on the face of viewer 2. Luminance is directed in the direction of occupant 3 as indicated by light ray 1411. Windshield 10 transmits this as ray 1412 with the transmittance (3% or less) provided by the fourth light state. Immediately on switching to the fourth light state the view through the windshield is reduced because occupant 3's eyes do not have time to adapt to the lower illumination inside the cabin (as described in relation to FIG. 4a). In the example given for FIG. 4a of a windshield having 1% transmittance, the luminance reaching occupant 3 (ray 1412 in FIG. 1b) is 1% of what it would be if outside the cabin (i.e. ray 1411), or about ⅟₂₅ of the luminance given in the example accompanying FIGS. 2b (i.e. 25% transmittance for windshield 10 in the second light state).

Similar to that described earlier for the third light state, in some embodiments the vehicle control system uses in-cabin lighting to maintain the illumination inside the cabin on switching to the fourth light state, or, it operates a light modulator in the vehicle's roof with a higher light transmittance than used for the windshield. This prevents (or minimizes) eye adaptation in occupants.

In some embodiments for safety or security reasons it can be desirable to continuously obstruct visual access from outside a vehicle through the windshield and/or other windows in autonomous-driving-mode, particularly if the vehicle's control system senses (using sensors) that there are no vehicle occupants, or the control system is instructed remotely that there are no occupants. In some embodiments the subsystem responsible for monitoring seat belt use by occupants is used to provide the vehicle control system with the occupancy status of the vehicle as well as the seat location of occupants.

In an example of a law enforcement embodiment a police vehicle can be driven in autonomous-driving-mode with no occupants and used to control the speed of traffic in poor weather conditions or where there is a road obstruction that necessitates temporarily reducing the allowable speed. It is likely that other road users will be more compliant (i.e. better behaved) if they believe the police vehicle is occupied and so the vehicle control system operates the windshield and side windows to obstruct visual access in autonomous-driving-mode using the second, third or fourth light states.

In an example of a specialized transport embodiment an armoured vehicle engaged in cash delivery can be driven autonomously and can be unoccupied. To enhance security it is desirable that the general public remain unaware of the vehicle's occupancy state and so the vehicle control system operates the windshield and side windows to obstruct visual access in autonomous-driving-mode using the second, third or fourth light states. When the vehicle reaches its destination and disengages autonomous-driving-mode its windshield and other windows can be programmed to switch to providing visual access (i.e. the first light state). The preceding were examples of embodiments where the vehicle control system uses the occupancy status of the vehicle to decide the selection of the windshield's light state (i.e. as a data input to the decision making algorithm that controls light state selection).

In some embodiments an occupant, a user/owner, a passenger transport fleet manager (e.g., a taxi fleet), a goods transport fleet manager (e.g., a courier fleet), a vehicle supplier/manufacturer, or a remote system (i.e. remote to the vehicle) can selectively obstruct visual access through the windshield (and also other windows) to the inside of a vehicle in autonomous-driving-mode or when the vehicle is parked. Obstructing visual access can be the automatic operation in autonomous-mode, or, the vehicle can provide the capability to automatically select this functionality on engaging autonomous-mode, or allow the functionality to be selected when in autonomous-driving-mode. Conversely, in some embodiments the functionality can be deselected so that the automatic response is overridden and visual access is maintained when in autonomous-driving-mode. Similarly, visual access from inside a vehicle to the outside environment in autonomous-driving-mode can be selected by an occupant, a user/owner, a passenger transport fleet manager (e.g., a taxi fleet), a goods transport fleet manager (e.g., a courier fleet), a vehicle supplier/manufacturer, or a remote system. Examples of remote system communication that can selectively (i.e. as a programmed response to) change the windshield transmittance in embodiments include vehicle-to-vehicle (V2V) communication or vehicle-to-infrastructure (V2I) communication, collectively known as vehicle-to-X communication (V2X) or vehicular communication systems.

In some embodiments while the vehicle is in autonomous-driving-mode, or parked, or stationary, the light states can be remotely selected using a key fob analogous to remote-central-locking or selected over a network such as using a mobile phone or over the internet. In embodiments where remote selection of light states over a shared network is provided (within the context of autonomous driving) the vehicle control system provides an appropriate level of security (e.g., encryption) to that used to remotely select or summon an autonomous vehicle. In some embodiments law enforcement and first responders can override the operation and select the first light state corresponding to maximum visibility. This can be done remotely (e.g., using a V2X communication) or using an emergency facility accessible on the vehicle. In both cases the vehicle control system, subsystem(s) and network(s) implement first responder support in hardware (i.e. using electronics) and software (i.e. executable code). In some embodiments visual access can be provided for a short period of time in response to an external signal or detection of an external object. In one example, as a building entry barrier is approached the embodiment's windshield can automatically switch to the first light state to provide unobstructed visual access from the outside and once the barrier is passed the windshield reverts to its previous light state. In another example, the embodiment's windshield can respond to a validated external communication by briefly selecting or flashing the first light state so that an external camera (e.g., a speed camera) can capture an image through the windshield, preferably the selection time is too short for road users to have visual access.

In some embodiments the vehicle control system dynamically operates the windshield (and optionally other windows and openings) to provide additional functionality in autonomous-driving-mode or when not in driver-mode. For example, in selecting a light state that provides reduced visual access from the outside the vehicle control system reduces sunlight transmittance (i.e. the solar spectrum from UV to infrared) with the advantage that solar heating of the vehicle's interior is reduced. In another example, in selecting a light state that provides reduced visual access from the outside the vehicle control system reduces glare for a vehicle's occupants from sunlight or oncoming vehicles. In some embodiments the vehicle control system can use one or more camera-based subsystems to identify sources of glare such as the sun or a car's head lights at night and momentarily select a suitable light state for a switchable window in line of sight to minimize glare from the bright light source and revert to the prior level of visual access when the source of glare has passed. Preferably the camera-based subsystem can identify the orientation of glare sources with respect to the orientation of the vehicle and provides 360 degrees coverage.

In some embodiments, the vehicle control system operates the embodiment's switchable light modulators to provide privacy depending on the vehicle's status (e.g., whether parked or stationary, or occupied or not). In this embodiment example the vehicle control system can use data supplied by its security and alarm subsystem as input to the decision to select one or more light states for the vehicle's windows. In another example, in selecting a light state that provides reduced visual access from the outside the vehicle control system (while autonomously driving) is responsive to weather conditions and reduces the sunlight illuminance of the cabin in bright sunshine (30,000 to 100,000 lux). It provides an illuminance within a range comfortable for the vehicle's occupants while simultaneously obstructing visual access in accordance with the description of the second, third or fourth light states (or intermediate light states).

In some embodiments the vehicle's control system can delay the switching from one light state to another. For example, when autonomous-driving-mode is engaged the vehicle control system can delay switching to the second light state for a period of time (e.g., seconds to minutes) or until the driving context changes such as the vehicle leaves a parking lot or a restricted area that requires visual access to be provided (i.e. the first light state to be selected). In some embodiments the vehicle control system can operate the transition from a first light state to the second (or vice versa) as a gradual transition (over seconds to minutes) using its intermediate light states. In these embodiments the vehicle control system uses the intermediate light states to provide progressive change in the windshield's visible light transmittance over a time period (e.g., five minutes) that allows at least partial adaptation of occupants' eyes to the changing illuminance in the cabin. This ensures visual access to the outside is maintained for occupants at a suitably high level as the windshield changes from the first light state to the second. In some embodiments the vehicle control system in autonomous-driving-mode transitions from the second light state (or another reduced light transmittance state) to the first light state over a short time period (e.g., 1-5 minutes) preceding stopping the vehicle at a destination. This allows occupants' eyes to adapt to the higher illuminance outside the vehicle before leaving and consequently avoids the experience of glare on leaving the vehicle.

In some embodiments one or more areas (or parts) of the windshield (and/or other windows or openings) are not covered by a switchable light modulator to allow sensors to be located there and have an unobstructed view through the window. Visible light sensors or monitors in embodiments can be photometric (preferred) or radiometric and include one or more of: measuring the visible light transmittance of the windshield in real time and preferably in a number of locations, capturing and analysing a camera's image through the windshield, capturing and analysing the camera image of test objects in one or more local areas (e.g. in a rearview mirror mounting area), measuring and analysing the reflectance of the windshield, measuring and analysing the illuminance and luminous exitance (measured in lux or lumen/metre$^2$) on each side of the windshield, or measuring and analysing the irradiance and radiant exitance (measured in watt/metre$^2$) on each side of the windshield from within the visible spectrum (i.e. 380 nm to 780 nm).

In some embodiments the correct functioning of the switchable light modulator in the windshield is monitored by the vehicle control system in at least the driver-mode to ensure the required visible light transmittance, transparency and visual access (i.e. minimum threshold) is being provided. The embodiment does not allow human driving until the windshield has implemented the first light state, and, changes over automatically to autonomous-driving-mode if a malfunction is detected. This is effectively fail-safe functionality and is implemented using data from suitable light monitoring sensors.

Figure 5:
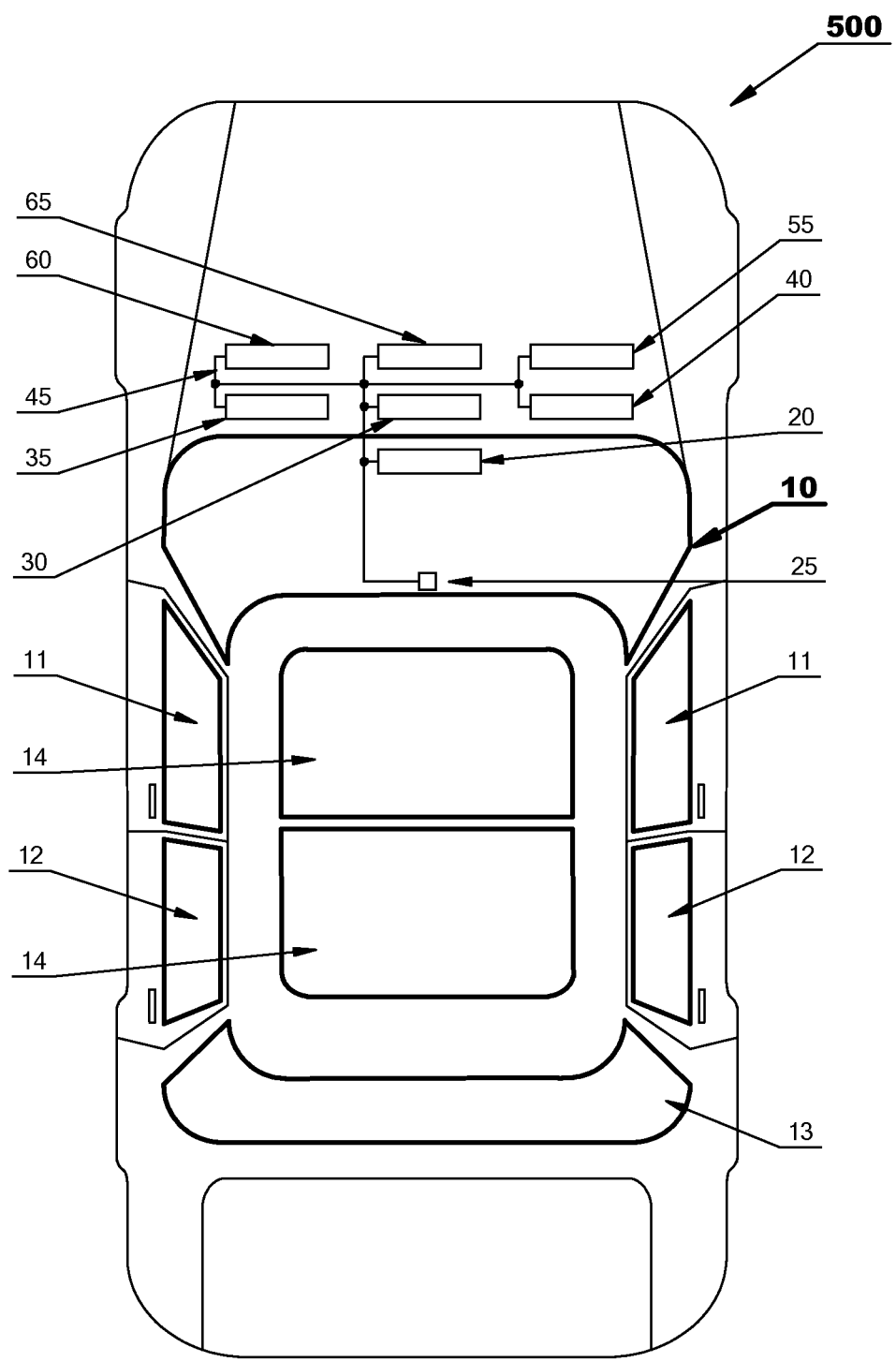
FIG. 5 shows an embodiment 500 of an autonomous vehicle that has switchable light modulators embedded in all its windows.

In the vehicle embodiment 500 shown in FIG. 5 (in plan view) the vehicle control system 30 operates multiple embedded switchable light modulators to provide control of visual access in autonomous-driving-mode, not just through the windshield 10 but also through the front side windows 11, the rear side windows 12, the rear window 13, and openings 14 in the roof. The vehicle control system 30 communicates with subsystems over a CAN network 45. Subsystems shown in FIG. 5 include one or more switchable light modular controllers 20, associated light sensors and cameras 25, in-vehicle-infotainment (IVI) system 35, telematics 40 (including autonomous driving sensors, GPS, and V2X), security and alarm subsystem 55, seat belt monitoring subsystem 60, and eye tracking subsystem 65. Any of the subsystems mentioned in this document can also be systems or electronic control units (ECUs) and can exchange data with the vehicle control system and/or with each other.

The infotainment system 35 can incorporate operation of the in-cabin lighting and the user interface including user selection of light states where allowed by the vehicle control system 30. Suitable user interfaces include switches mounted on door panels, a touch screen in the dashboard, or a local-area, hand-gesture, detection system (i.e. to detect hand movement adjacent the window to be changed). In some embodiments the infotainment system 35, or an independent dashboard mounted display, provides occupants with information on the status of the windows, and in particular on whether the vehicle control system 30 can provide privacy in the current driving context or not. For example, in some embodiments the fourth light state (described earlier in relation to FIGS. 4a and 4b) can be sufficiently opaque to ensure privacy in daylight but not at night time when the cabin lighting is turned-up. The information can be displayed in the form of an icon or a text message. Preferably in embodiments an icon is provided to inform occupants when viewers outside the vehicle are unlikely to be able to see through the windshield 10 (i.e. windshield 10 is in the second, third, fourth, or an intermediate light state). In some embodiments a graphic similar to FIG. 5 can be displayed to show the status of the windows to occupants. It will be appreciated that as the eyes of occupants can be adapted to the lower illumination in the cabin provided in embodiments, occupants benefit from feedback on how the windows appear outside the vehicle.

In embodiment 500 the vehicle control system 30 can change the eye adaptation of occupants over time by using the electrically selectable light states of its switchable windows 10, 11, 12, 13, and 14 to significantly reduce the illuminance inside a vehicle when compared to outside in autonomous-driving-mode. In some embodiments the vehicle control system 30 can use an eye tracking subsystem 65 to monitor the eye adaption of one or more occupants and use this data as input to the decision to select a light state. In some embodiments when transitioning over a time period between a current light state and a final state (as described earlier in relation to FIGS. 3a to 4b) the eye tracking subsystem 65 can provide feedback (or be a feedback loop) to the vehicle control system 30 on the progress of eye adaptation with occupants.

In some embodiments where most or all of an autonomous vehicle's windows are controlled using switchable light modulators (i.e. embodiment 500 in FIG. 5) the contrast ratio defined as the ratio of illuminance outside to inside the vehicle (i.e. the cabin) is controlled in autonomous-driving-mode during daylight (and optionally in brightly lit areas at night time). The contrast ratio is used as an indicator of visual access from outside to inside a vehicle and the vehicle control system selects the light states of its switchable light modulators to maintain operation within a suitable range. In embodiments a ratio of 2.0 or more for this contrast ratio (i.e. the ratio of the lux measured either side of the windshield) is preferable, however, a requirement in some embodiments to provide a minimum cabin illuminance can override the contrast ratio in selecting light states. In embodiments the illuminance outside can be measured through the windshield (or other window such as the rear window) using an area not covered by its switchable light modulator.

In some embodiments windows can have restricted or unrestricted selection of light states outside of autonomous-driving-mode. In an example of restricted operation the vehicle control system 30 operates a switchable light modulator with a subset of the available light states (i.e. a reduced range of visible light transmittance). In another example, a local area of a light modulator corresponding to a visor area at the top of a windshield can be operated with unrestricted light states to minimize sunlight glare as required whereas the main viewing area of the windshield can be restricted to the first light state only in driver-mode. In some embodiments the switchable light modulators of embodiments can be controlled locally in zones, segments, or pixels based on computations derived from (or informed by, or in response to) sensor data such as camera images. In some embodiments with multiple light modulator windows the vehicle control system can operate each window independently such that for example visual access could be denied at one side of a vehicle but not the other, or the vehicle control system can allow an occupant to select the light state to use for a particular window depending on operating rules for the mode engaged.

Figure 6:
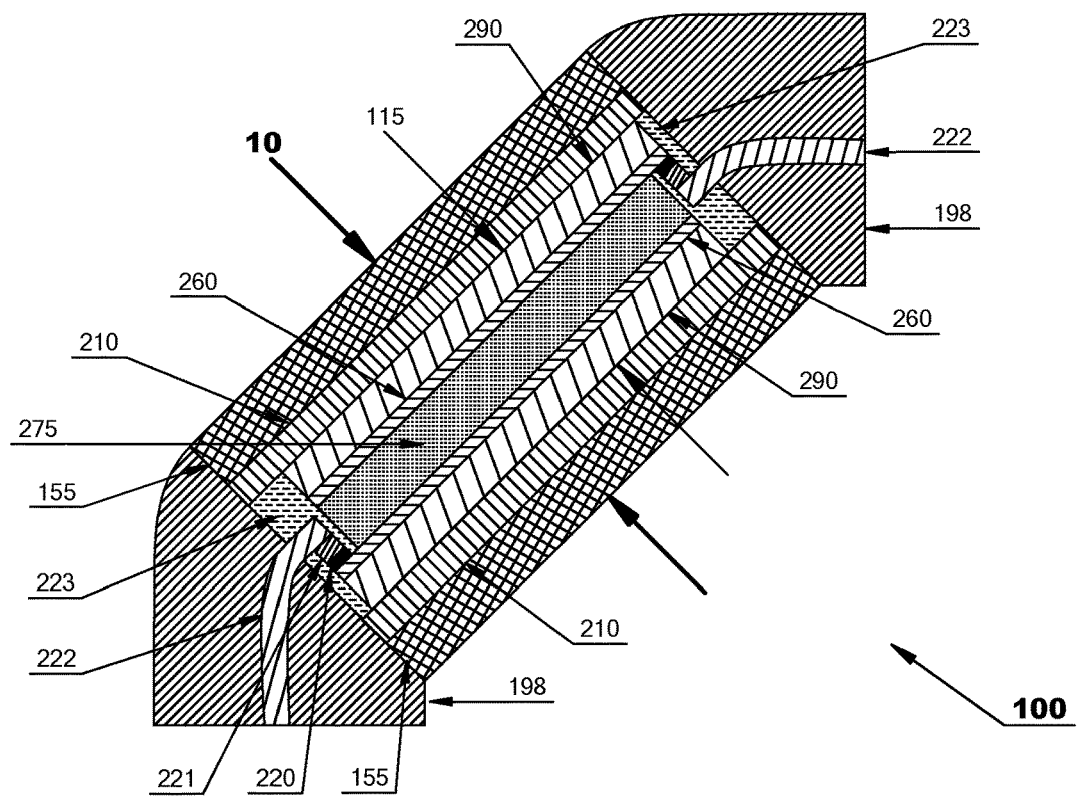
FIG. 6 shows a cross-section of windshield 10 of embodiment 100 with embedded switchable light modulator 115.

FIG. 6 shows windshield embodiment 10 with a switchable light modulator 115 laminated between a pair of glass panes 155. The switchable windshield 10 has one or more transparent light states and can be implemented as, or referred to as, or be, a smart window, a switchable window, an electronic dimming window, a light shutter, a light attenuator, a variable light transmittance device, a variable light absorptance device, a variable light reflectance device, a variable light scattering device, a see-through light control device, a see-through electronic skin, or a see-through display. The switchable light modulator of an embodiment's windshield can vary its transparency, and concomitantly its visual access, by attenuating part (i.e. one or more bands) or the entire visible light spectrum (i.e. 380 nm to 780 nm). An embodiment's windshield attenuates the incident visible light spectrum by absorbing, reflecting, or scattering at least some light wavelengths, and typically can use a combination of two of these or all three. Preferably, one of absorbing, reflecting or scattering of visible light is dominant, and preferably light absorption accounts for the greater loss of light when regular light transmittance is reduced by an embodiment's windshield. In embodiments transparency and visual access is provided by the windshield's transmission of regular visible light.

Regular light transmission is also known as specular light transmission, specular light refraction, or direct light transmission. It is the property of a material (also known as transparency) that transmits visible light and the light follows Snell's Law and allows a viewer see an object through the material. Regular transmission causes light to propagate (i.e. to be refracted) without scattering. Non-regular light transmission is known as haze and in ISO 14782 (Plastics—Determination of haze for transparent materials) it is defined as the "percentage of transmitted light, passing through a specimen, which deviates from the incident light by more than 0.044 rad (2.5 degrees) by forward scattering". In BS 2782-5 method 521A (Determination of haze of film and sheet) direct transmittance is used instead of regular transmittance and is defined as "the ratio of the radiation passing through the barrier without deviation, to the incident radiation". The McGraw-Hill Dictionary of Scientific and Technical Terms defines specular transmittance of electromagnetism as "the ratio of the power carried by electromagnetic radiation which emerges from a body and is parallel to a beam entering the body, to the power carried by the beam entering the body.

As used herein regular light transmission is light transmission through a material which deviates by less than or equal to 4 degrees, and preferably by less than or equal to 2.5 degrees, by forward scattering and consequently excludes haze (i.e. diffuse/scattered light transmission). Similarly, the distinction between specular reflection from an embodiment's windshield and diffuse reflection can be made. In embodiments specular (or glossy) reflection of visible light is preferred for the part of incident visible light not transmitted or absorbed.

Regular visible light transmittance is equal to incident visible light less visible light reflectance, absorptance, and scattering and includes the percentage losses of all surfaces, interfaces, and optical layers that comprise the windshield embodiment. In the following equation incident visible light is expressed as 100% and the other terms are a percentage of this. Regular light transmittance is (Rg_LT), reflectance or reflected visible light is (R_VL), absorptance or absorbed visible light is (A_VL), and scattered visible light is (Sc_VL):

$$Rg\_LT=100\%-R\_VL-A\_VL-Sc\_VL$$

FIG. 1a shows an embodiment providing visual access through the windshield for other road users in a first light state, and FIG. 2a shows visual access being obstructed in a second light state. In the first light state there is sufficient regular light transmittance to provide visual access through an embodiment's windshield from outside a vehicle and an observer's visibility is proportional to the luminance (measured in candela/metre$^2$) of surfaces within the cabin. In daylight the source of the objects' luminance within the cabin is sunlight (directly and indirectly incident on the object) and the level entering the cabin is controlled by the light state selected by the vehicle control system for an embodiment's light modulators. At night time the cabin lighting is the source of an object's luminance (in areas without street lighting) and in embodiments can be controlled by the vehicle control system to deny visual access from the outside.

In some embodiments in autonomous driving mode the visible light transmittance of the windshield is operated while driving at night to be in the first light state and/or comparable to driver-mode, and operated differently in daylight as described earlier for the second light state. Some embodiments use intermediate light states to provide a transition between the first and second light states that is responsive to a vehicle's surrounding lighting (or the brightness outside the vehicle). For example, an embodiment's windshield can be responsive to changing light levels while being autonomously driven such as when passing from a brightly sunlit road into a dimly-lit tunnel or indoor parking lot. In another example, an embodiment's windshield can be responsive to changing light levels while being autonomously driven at night time when passing from a section of road that doesn't have street lighting to well-lit city streets. These and previous examples describe how the vehicle's control system operates the windshield as a human-machine-interface that optimizes ergonomics for a vehicle's occupants and is responsive to the driving context.

In some embodiments the switchable light modulator uses light scattering (i.e. the scattering of incident light) to reduce visual access through the windshield and this results in a reduction of regular light transmittance but not a significant reduction of the visible light spectrum transmittance and the windshield can appear translucent or hazy. An analogy can be made with the appearance of frosted glass. In some embodiments the level of haze in the windshield is electrically selectable and denies visual access when increased significantly. An embodiment with a light scattering modulator can use a chiral nematic liquid crystal as its electro-optical type as described later.

In some embodiments the level of visible light reflection from the windshield for viewers outside the vehicle can be increased by incorporating one or more high-refractive-index layers, in particular where these layers are applied to a surface of the outer glass pane. This has the desirable effect of making the windshield appear more mirror-like (i.e. increased reflectance of specular and glossy light) from outside (for other road users) than from inside (for occupants).

In embodiments a suitable switchable light modulator includes one of the following electro-optical types, or hybrid versions thereof: an electrophoretic device, a liquid crystal device, a guest-host liquid crystal device, a dye-doped liquid crystal device, an electrochromic device, an electrochromic device incorporating an electrolytic fluid gel, an electrokinetic device, a suspended particle device, or an electrowetting device. Most of these electro-optical devices incorporate a fluid layer; the exception is some electrochromic devices that have solid layers only. In some embodiments the switchable light modulator provides a colour or colour tint in one or more of its light states. Preferably embodiments are colour neutral in the first light state. A coloured second light state could match or contrast with the paintwork of the vehicle, however, a black tint, metallic tint or neutral is preferred for the appearance of the light states.

In an electrophoretic embodiment example the switchable light modulator comprises two parallel spaced apart transparent film substrates and can be described as an electrophoretic film. The space between the substrates comprises an electrophoretic cell that contains an electrophoretic ink, and the electrophoretic cell is optically bonded (i.e. applied) to the substrates. The electrophoretic ink has charged particles, preferably black, and preferably having the same polarity (i.e. the same type) suspended in a suspending fluid. The substrates are coated with conductive electrodes that are substantially transparent to sunlight's visible spectrum. The electrophoretic film has at least one light state that is transparent to visible light to provide visual access in driving-mode. Charged particles respond to an electric field applied to an electrophoretic film's electrodes to move (or switch) between light states.

The first light state is selected by applying an electrical signal to the electrophoretic light modulator embedded in the windshield to maximally concentrate charged particles within the electrophoretic layer/cell to remove them from the path of visible light through the windshield and maximize visible light transmittance and provide visual access. The second light state (used in autonomous-driving-mode) is selected by applying an electrical signal to spread charged particles within the electrophoretic cell to lie in the path of visible light through the windshield and reduce light transmittance and obstruct visual access. In intermediate light states the charged particles move to variable positions between its extreme light states to provide a variable visible light transmittance, a variable black tinted appearance (preferably), and variable obscuring (or impairing or diminishing) of visual access. A third and/or fourth light state as described earlier corresponds to a maximum spreading of charged particles within the cell to achieve a minimum visible light transmittance. In addition, a fourth light state can also employ light scattering charged particles such as a small minority (<10% of total particles) of white particles to scatter any visible light not otherwise absorbed or reflected and render the windshield opaque (or quasi opaque).

Electrophoretic, switchable light modulators are described in greater detail in the applicant's application WO/2014/146937 titled "An Electrophoretic Device Having a Transparent Light State". In a liquid crystal device the fluid is preferably a chiral nematic liquid crystal and a suitable device is described by the applicant in European Patent Application number 15182332.5 titled "A Chiral Nematic Liquid Crystal Light Shutter".

In some electrochromic embodiments an electrolytic gel is in contact with an electrochromic layer that overlays an electrode on one substrate and an ion storage layer that overlays the other electrode on the other substrate. An example of such an electrochromic device is described in Gentex's U.S. Pat. No. 6,934,067. In many electrochromic embodiments the electrolytic layer is a solid and the device can be made with glass or film/foil substrates. An example of the former is described in Saint Gobain's U.S. Pat. No. 5,985,486 and an example of the latter in ChromoGenics WO/2014/204387. In a hybrid electrochromic/photochromic embodiment the switchable material is a liquid or gel. The switchable liquid or gel is described in Switch Material's U.S. Pat. No. 8,837,032.

An electrokinetic device is a hybrid of an electrophoretic device and comprises an ink that includes charged particles suspended in a fluid. An example of an electrokinetic display can be found in HP's U.S. Pat. No. 7,957,054. In a suspended particle device the fluid is a suspension of anisotropic, polyiodide particles dispersed in a polymeric liquid and background information can be found in Research Frontier's U.S. Pat. No. 6,900,923. Electrowetting devices use an electrical field to wet (or cover) a substrate's surface with a light absorbing fluid that in the absence of the field repels the fluid to reveal the surface. An example of an electrowetting device is described in Sun Chemical Corp.'s U.S. Pat. No. 8,854,714.

In embodiments the switchable light modulator's substrates can be flexible or rigid and made of polymer or glass, and includes thin flexible glass substrates. At least one substrate has a transparent electrode (TE) layer including indium tin oxide, PEDOT (a conductive polymer), silver nanowires, or graphene. Other possible substrate coatings include: an inorganic dielectric layer, an organic dielectric layer, a metallic or semiconductor layer, an antireflective coating comprising the preceding, a molecular alignment layer, an electrochromic layer, an ion storage layer, a micro and/or nano polymer structured layer, or an active matrix layer.

In some embodiments the switchable light modulator forms part of a laminate structure incorporating a safety glass construction and comprising in addition to the switchable light modulator function at least one polymer sheet, one rigid glass pane, and one optically-clear adhesive layer that bonds the polymer sheet to the glass pane (as described later with respect to FIGS. 6, 7 and 8). The switchable light modulator function can be incorporated into the polymer sheet (i.e. a laminate structure) or be coatings on the glass pane, or be a separate device bonded to one or more plastic sheets or glass panes.

In embodiments the vehicle control system that controls autonomous-driving-mode and driver-mode is functionally coupled (i.e. operationally attached) to the switchable light modulators through one or more subsystems 20 (see FIGS. 1 to 5) or distributed embedded systems. Subsystem 20 is wired to the light modulators and includes driver outputs that provide the driving signals, program and data storage, cpu, vehicle network support, and optionally connects with light sensors used in the selection of light states. The latter were described earlier. In embodiments the windshield and optionally other vehicle windows are an autonomous driving subsystem because they are selectively controlled by the vehicle control system. Background information on the hardware and software of vehicle control systems of autonomous vehicles can be found in Google's WO2012/154208, Gray and Company's U.S. Pat. No. 8,126,642, or Intel's WO2014/116898. The vehicle control system in an autonomous vehicle is a computer (w.r.t. its hardware architecture) and can run advanced computer operating systems including automotive specific versions of one of the following: a Linux system, a Microsoft Windows system, a Unix system, an Apple/MAC system, an Android system, a proprietary vehicle manufacturer system, or one of a number of fully deterministic, real-time operating systems. The vehicle control system can incorporate the operation of the In-Vehicle-Infotainment (IVI) system and the telematics system as well as various vehicle embedded subsystems.

The switchable light modulator 115 in windshield embodiments, and its associated controller 20, can be functionally coupled to the vehicle control system(s) 30 using a wireless link, a wired link, a vehicle bus, or any combination of these. An example of the latter is the Controller Area Network bus (CAN bus) 45 shown in FIG. 5. Other wired examples include LIN, TTP, FlexRay, and Ethernet. Examples of wireless networks include point-to-point and line-of-sight such as Near Field Communication (NFC) or Bluetooth.

Preferably, switchable light modulators for use in embodiments require power (i.e. a driving signal applied to its electrodes) only when changing light states and not to maintain light states. Such light modulators are known as bistable. Advantageously some electrophoretic switchable light modulators have this property. The applicant's application WO/2014/146937 titled "An Electrophoretic Device Having a Transparent Light State" shows a bistable electrophoretic light modulator together with an example of a suitable subsystem controller and driver for the light modulator, and describes driving signals to select bistable light states.

FIG. 6 shows a cross-section through a windshield 10 (comprising all the elements between the arrows shown) that is part of the autonomous vehicle embodiment 100 already described in relation to FIGS. 1a to 4b. It comprises a switchable light modulator film 115 (comprising the elements between the arrows shown) laminated between glass panes 155 using optical adhesive layers 210 known as interlayers. In FIG. 6 windshield embodiment 10 is shown in the first light state. Monolithic windshield 10 is bonded or otherwise permanently fixed to the vehicle bodywork 198 using for example an automotive grade urethane adhesive. In some embodiments an outer glass pane can be one type such as solar glass and an inner pane another type such as clear glass. In some embodiments the thickness of the outer and inner glass panes 155 are different. In some embodiments one or both glass panes 155 are clear glass (i.e. untinted) to maximize the visible light transmittance of windshield 10 in the first light state. Windshield 10 has curvature and the switchable light modulator 115 conforms to the curvature without apparent stress related artefacts.

Switchable light modulator 115 comprises substrates 290 coated with transparent electrodes 260. Between the switchable light modulator's electrodes 260 there are one or more layers that make-up the electro-optical function or cell 275 as described earlier in relation to suitable switchable light modulator types. On opposing substrates (i.e. opposing ITO electrodes 260), connection ledges are prepared: a power or signal lead 222 is soldered to a copper tape 221 or other highly conductive flexible material that in turn is bonded to the ITO electrode surface 260 via a conductive adhesive or conductive ink 220. The four edges of the glass laminate are sealed with suitable silicone or other sealant 223. The bodywork 198 can be shaped to provide a seat for windshield embodiment 10 (i.e. L or U shaped) and protects the laminate edges and can seamlessly incorporate it into the bodywork. The contact area between the bodywork 198 and the windshield 10 can incorporate a sealant and can also incorporate a channel and strain relief for the power leads 222.

Glass laminate 10 is shown comprising a single switchable light modulator 115 that substantially covers its face area, but film 115 can also cover just a part of laminate 10 and the uncovered area can have an extra interlayer(s) or a PET sheet to create a uniform thickness between the pair of panes 155. In some embodiments an interlayer has a cut-out area that accommodates switchable light modulator 115 and in this case the glass laminate has three or more separate interlayer sheets in a sandwich ahead of lamination. Furthermore, a glass laminate 10 can have multiple films 115 distributed in a tiled or zoned manner (i.e. not overlapping).

An interlayer 210 can be used in embodiments to add functionality such as one or more of the following: UV filtering (>99%), safety and security (w.r.t. breakage and penetration in a collision), sound insulation, fire protection, and decoration or coloration. Interlayer 210 can be polyvinyl butyral (PVB), ethylene-vinyl acetate (EVA) or polyurethane (PU), and advantageously incorporates a UV filtering function that absorbs 99% or more of incident UV light. Preferably, an EVA interlayer is used as these have the lowest maximum processing temperature and excellent adhesion to PET substrates. A vacuum-bag glass laminating process is preferred over an autoclave. Suitable interlayer films for use with the present invention include EVASAFE from Bridgestone Corporation, Japan, and S-LEC EN from Sekisui, Japan. Process guidelines for laminating PET films to glass are available from both suppliers.

Figure 7:
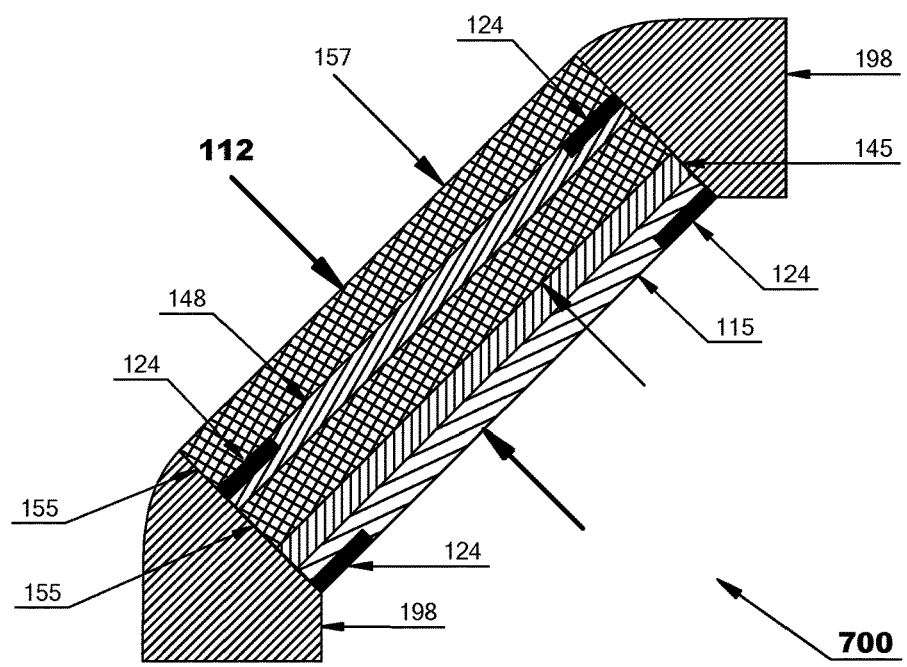
FIG. 7 shows a cross-section of windshield 112 of embodiment 700.

FIG. 7 shows a cross-section through a windshield 112 (comprising all the elements between the arrows shown) that is part of an autonomous vehicle embodiment 700. It comprises a switchable light modulator film 115 (described earlier in relation to FIG. 6) applied to the inside face of a prior-assembled glass laminate 157 (i.e. the prior assembly is a conventional windshield) using an optical adhesive layer 145. In FIG. 7 windshield embodiment 112 is shown in the second light state and the vehicle control system of embodiment 700 has autonomous-driving-mode engaged. Its glass laminate 157 supports the applied switchable light modulator 115 and is bonded to the vehicle bodywork 198. There can be optional masking elements 124 (e.g. enamel or paint) to hide edge areas of the switchable light modulator 115 and together these elements can create a seamless appearance from inside and outside the vehicle 700.

A suitable adhesive type 145 for applying a switchable light modulator film 115 to a glass surface includes a pressure sensitive adhesive and a suitable technique includes laminating between a pair of NIP rollers. Preferably the adhesive is in the form of a layer (protected with a release liner until used) such as an optical clear adhesive (OCA), or, alternatively the adhesive can be an optical clear resin (OCR). Preferably the adhesive is reworkable or provides the ability to be removed using external means such as a suitable solvent. If not already provided the adhesive layer 145 can incorporate an ultraviolet (UV) filter and in use filters 99% or more of the sunlight ultraviolet spectrum to shield the applied switchable light modulator 115. Suitable adhesive 145 can be loaded with UV absorbing nanoparticles that have negligible visible absorption. OCA films and OCR resins and UV filtering films and resins are available commercially from a number of companies including 3M, Nitto Denko, Mactac, Adhesives Research, Hitachi Chemical, and Sekisui.

Glass laminate 157 is prior assembled and complies with the regulatory requirements for conventional windshields. Preferably glass laminate 157 comprises a pair of thin glass panes 155 optically bonded to each other using a PVB interlayer 148 and an autoclave process. The PVB interlayer incorporates one or more polymer carrier sheets with adhesive on both sides. The PVB interlayer 148 filters 99% or more of the sunlight ultra-violet spectrum to shield film 115.

Figure 8:
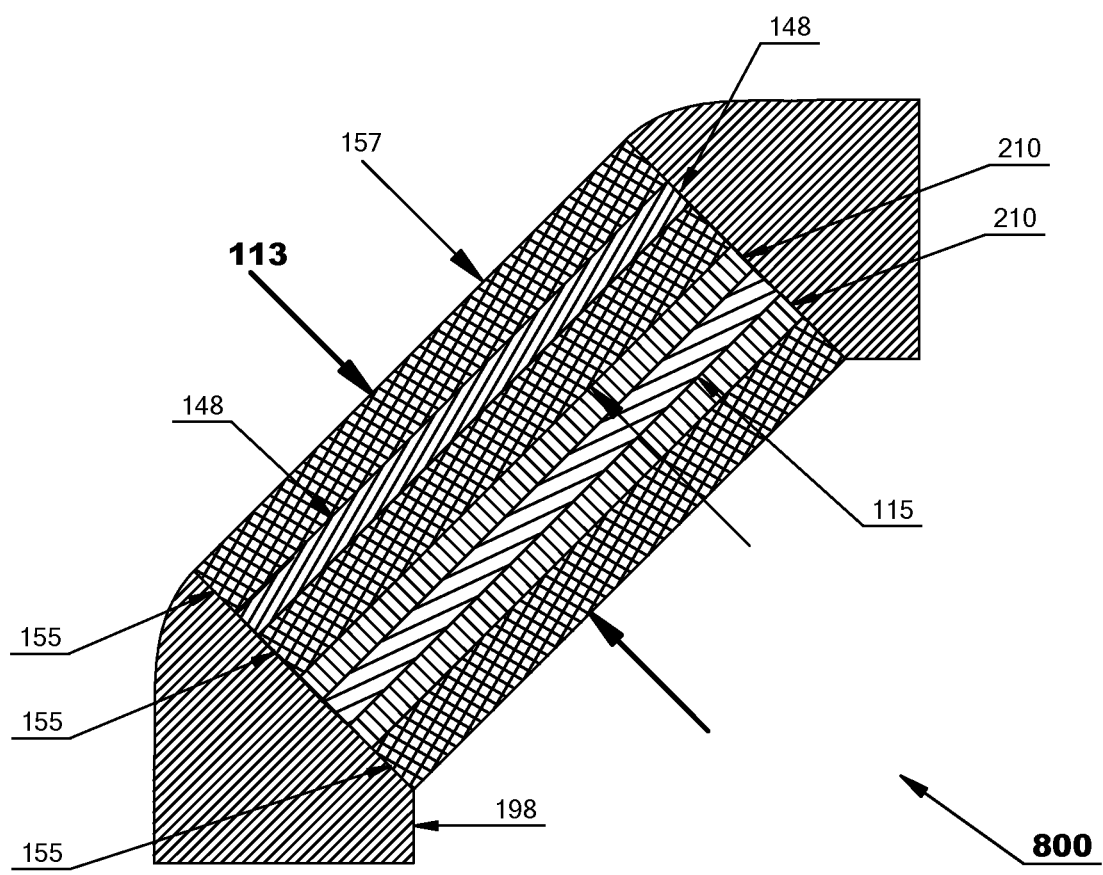
FIG. 8 shows a cross-section of windshield 113 of embodiment 800.

FIG. 8 shows a cross-section through a windshield 113 (comprising all the elements between the arrows shown) that is part of an autonomous vehicle embodiment 800. It combines elements from windshield 10 (FIG. 6) and windshield 112 (FIG. 7) and elements that are in common have the same numbers. In windshield embodiment 113 the switchable light modulator film 115 (described earlier in relation to FIG. 6) is laminated between a prior-assembled glass laminate 157 and a third glass pane 155 using interlayers 210. The inside pane 155 (i.e. in contact with the cabin environment) hermetically seals and protects the switchable light modulator 115. In some embodiments the inside pane can be a thin, transparent, polymer sheet in which case an optical-clear-adhesive 145 can replace the interlayer 210 shown in FIG. 8. In other embodiments the inside pane can be a thin rigid glass pane, or a thin, flexible glass film (e.g., having 175 microns thickness).

In some embodiments the windshield is a transparent rigid polymer pane and the switchable light modulator is applied to its inside face using an optical adhesive layer. In other embodiments the switchable light modulator is laminated between a pair of rigid polymer panes analogous to the glass laminate 10 shown in FIG. 6.

The switchable light modulators in other vehicle windows and openings can be assembled similarly to windshield 113 shown in FIG. 8, windshield 112 shown in FIG. 7, or windshield 10 shown in FIG. 6. Alternatively, a switchable light modulator can be applied to the inside face of a transparent rigid pane or laminate (glass or transparent polymer) using an optical adhesive layer. In such embodiments the switchable light modulator can have flexible glass film substrates to provide environment protection (e.g., hermetic seal) as well as mechanical durability (e.g., scratch resistance).

In some embodiments one or more of the other vehicle windows are not switchable and instead can be tinted (providing a fixed level of visible light transmittance from within the range 1% to 75%), or opaque or translucent. Preferably in embodiments the non-switching windows have a fixed transmittance and fall within the range 10 to 30% where allowed by regulations (e.g., for the rear windows but not the front windows in driver mode).

The invention claimed is:

1. A road vehicle configured for autonomous driving, the road vehicle having a windshield incorporating one or more switchable light modulators and one or more layers that increase visible light reflection for an outside viewer, and a control system being configured to selectively operate said windshield as a one-way mirror controlling a regular visible light transmittance of the windshield's light modulators between two or more electrically switchable light states that provide respective levels of visual access through the windshield from outside the road vehicle, according to a driving context for the road vehicle, wherein the windshield has a first light state that provides visual access from an outside environment to inside the road vehicle through the windshield simultaneously with providing visual access from inside to the outside and a second light state, analogous to a one-way mirror, that obstructs visual access from outside to inside simultaneously with providing visual access from inside to the outside, and during daylight, the control system is operable to maintain a ratio of illuminance outside to inside the road vehicle to 2.0 or more in the second light state, and wherein the control system is responsive to human driving to select said first light state and the control system is responsive to autonomous driving and to a driving context for the road vehicle to select the second light state.

2. A road vehicle as claimed in claim 1 wherein said selection of light states is performed over sufficient time for eyes of occupants of said road vehicle to adapt to illuminance to maintain a similar perceived brightness of objects outside for occupants in both said first and second light states.

3. A road vehicle as claimed in claim 2 wherein the control system includes an eye tracking system arranged to monitor an eye state of one or more occupants of the road vehicle and to select a light state for the windshield accordingly, and the control system is arranged to transition between light states for the windshield according to the eye state of said one or more occupants.

4. A road vehicle as claimed in claim 1 wherein the driving context includes any of: the road vehicle occupancy status, a driving environment's light level, weather conditions, proximity of other road users, type of road user detected, type of occupant, surrounding traffic level and flow, driving speed, urban or rural location, road type, detection of a situation likely to alarm occupants, mandatory requirement to provide or deny visual access in certain areas/situations, law enforcement override, proximity of certain infrastructure, privacy or security requirement, operator/occupant override of programmed settings, transitioning on engaging autonomous driving, or transitioning between autonomous driving and coming to a stop at a destination.

5. A road vehicle as claimed in claim 1 wherein the first light state has a visible light transmittance of 45% or more and provides visual access from the outside and the second light state has 35% or less visible light transmittance and obstructs visual access from the outside.

6. A road vehicle as claimed in claim 1 wherein said switchable light modulator includes one of the following electro-optical types, or hybrid versions thereof: an electrophoretic device, a liquid crystal device, a guest-host liquid crystal device, a dye-doped liquid crystal device, an electrochromic device, an electrochromic device incorporating an electrolytic fluid gel, an electrokinetic device, a suspended particle device, or an electro-wetting device.

7. A road vehicle as claimed in claim 6 wherein the road vehicle further comprises a plurality of windows each with a respective switchable light modulator therein and wherein said control system is operable to independently control visual access through said windows in accordance with said driving context.

8. A road vehicle as claimed in claim 6 wherein the windshield comprises a switchable light modulator film laminated between glass panes in a sandwich structure with optical adhesive, and a resulting monolithic laminate is bonded or fixed to the road vehicle bodywork.

9. A road vehicle as claimed in claim 8 wherein one or both of said glass panes are clear glass and maximize the visible light transmittance of the windshield in the first light state.

10. A road vehicle as claimed in claim 8 wherein the windshield's outer pane is a laminate of two panes and the switchable light modulator is laminated between it and an inner pane.

11. A road vehicle as claimed in claim 6 wherein the switchable light modulator comprises two parallel spaced apart transparent film substrates that are coated with transparent electrodes and in the space between an electro-optical cell, and the cell is responsive to electrical signals applied to the electrodes to select light states.

12. A road vehicle as claimed in claim 1 wherein the control system is operable to select intermediate light states with variable visible light transmittance.

13. A road vehicle as claimed in claim 12 wherein the control system is arranged to provide progressive change in the windshield's visible light transmittance over a time period, including in advance of the road vehicle stopping at a destination.

14. A road vehicle as claimed in claim 1 where said selection of said second light state obstructs visual cues from inside the road vehicle that would otherwise signal that the road vehicle is being driven autonomously.

15. A road vehicle as claimed in claim 1 wherein the driving context includes any of: mandatory requirement to provide or deny visual access in certain areas/situations, law enforcement override, proximity of certain infrastructure, operator/occupant override of programmed settings, transitioning on engaging autonomous driving, or transitioning between autonomous driving and coming to a stop at a destination.

16. A road vehicle as claimed in claim 1 wherein said one or more layers is applied to a surface of an outer glass pane.

* * * * *